(12) United States Patent
Yagisawa

(10) Patent No.: US 9,985,966 B2
(45) Date of Patent: May 29, 2018

(54) ANONYMOUS SIGNATURE SCHEME

(71) Applicant: Empire Technology Development LLC, Wilmington, DE (US)

(72) Inventor: Masahiro Yagisawa, Kanagawa (JP)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days. days.

(21) Appl. No.: 14/890,022

(22) PCT Filed: Jan. 7, 2014

(86) PCT No.: PCT/US2014/010427
§ 371 (c)(1),
(2) Date: Nov. 9, 2015

(87) PCT Pub. No.: WO2015/105479
PCT Pub. Date: Jul. 16, 2015

(65) Prior Publication Data
US 2016/0127366 A1    May 5, 2016

(51) Int. Cl.
*H04L 29/06* (2006.01)
*H04L 9/32* (2006.01)

(52) U.S. Cl.
CPC ........ *H04L 63/0876* (2013.01); *H04L 9/3247* (2013.01); *H04L 63/0853* (2013.01); *H04L 63/123* (2013.01); *H04L 2209/42* (2013.01)

(58) Field of Classification Search
CPC ............. H04L 63/0853; H04L 63/0876; H04L 9/3247; H04L 63/123; H04L 2209/42
See application file for complete search history.

(56) References Cited

U.S. PATENT DOCUMENTS

| | | | | |
|---|---|---|---|---|
| 5,608,800 | A * | 3/1997 | Hoffmann | H04L 9/3247 713/150 |
| 6,298,153 | B1 * | 10/2001 | Oishi | G06F 21/606 380/277 |
| 8,170,206 | B2 * | 5/2012 | Ishiguro | G11B 20/00521 380/44 |
| 2003/0233556 | A1 * | 12/2003 | Angelo | G06F 21/6245 713/186 |
| 2005/0169461 | A1 * | 8/2005 | Canard | H04L 9/3255 380/28 |

(Continued)

OTHER PUBLICATIONS

Bardet, M., et al., "On the complexity of Grabner basis computation of semiregular overdetermined algebraic equations," Proceeding of the International Conference on Polynomial System Solving, pp. 1-4 (2004).

(Continued)

*Primary Examiner* — Mohammad A Siddiqi

(57) ABSTRACT

Technologies are generally described for providing an anonymous signature scheme. In some examples, a method performed under control of an end device ma 320 include receiving public parameters from a central system; generating an enciphering function based at least in part on the received public parameters; calculating parameters for a signature based at least in part on the generated enciphering function; and transmitting, to a verifying device, the signature that includes a message, a key of the end device and the calculated parameters for the signature.

16 Claims, 10 Drawing Sheets

(56) References Cited

U.S. PATENT DOCUMENTS

| | | | |
|---|---|---|---|
| 2005/0289078 A1* | 12/2005 | Wary | G06Q 20/382 705/64 |
| 2006/0015737 A1 | 1/2006 | Canard et al. | |
| 2008/0130893 A1* | 6/2008 | Ibrahim | G06F 21/572 380/277 |
| 2008/0177636 A1* | 7/2008 | Yoshida | G06Q 10/107 705/26.35 |
| 2010/0083354 A1 | 4/2010 | Tsirtsis | |
| 2010/0205431 A1* | 8/2010 | Griffin | G06F 21/32 713/158 |
| 2011/0026711 A1 | 2/2011 | Almeida | |
| 2011/0060903 A1 | 3/2011 | Yoshida et al. | |
| 2012/0124379 A1 | 5/2012 | Teranishi | |
| 2012/0278628 A1* | 11/2012 | Chen | H04L 63/0853 713/176 |
| 2013/0326602 A1* | 12/2013 | Chen | H04L 9/3255 726/6 |

OTHER PUBLICATIONS

Bellare, M., and Duan, S., "New definitions and designs for anonymous signatures," Cryptology ePrint Archive: Report 2009/336, pp. 1-26 (Jul. 9, 2009).

Camenisch, J., and Lysyanskaya, A., "Signature Schemes and Anonymous Credentials from Bilinear Maps," Advances in Cryptology—CRYPTO 2004, vol. 3152, pp. 56-72 (2004).

Fischlin, M., "Anonymous signatures made easy," Public Key Cryptography—PKC 2007, vol. 4450 of the series Lecture Notes in Computer Science, pp. 31-42 (2007).

Gao, W., et al., "Controllable Ring Signatures," Information Security Applications vol. 4298 of the series Lecture Notes in Computer Science, pp. 1-14 (2007).

Han, S., et al., "Practical Fair Anonymous Undeniable Signatures," International Journal of Information and Communication Engineering, vol. 2, Issue 8, pp. 571-576 (2006).

International Search Report and Written Opinion for International Application No. PCT/US14/10427, dated Jun. 6, 2014.

Law, L., et al., "How to Make a Mint: The Cryptography of Anonymous Electronic Cash," WCL Journal & Law Reviews, AULR, vol. 46, Issue 4, pp. 1131-1162 (Apr. 1997).

Matsumoto, T., and Lmai, H., "Public quadratic polynomial-tuples for efficient signature-verification and message-encryption," Proceeding Lecture Notes in Computer Science on Advances in Cryptology—EUROCRYPT, pp. 419-453 (Apr. 1, 1988).

Tsujii, S., et al., "Piece in hand concept for enhancing the security of multivariate type public key cryptosystems: Public key without containing all the information of secret key," Cryptology ePrint Archive: Report 2004/366, pp. 1-16 (Dec. 16, 2004).

Tsujii, S., et al., "Proposal Integrated MPKC: PPS—STS Enhanced Perturbed Piece in Hand Method," IEICE Tech. Rep., vol. 109, No. 113, ISEC2009-27, pp. 139-146 (Jul. 2009).

Wolf, C., and Preneel, B., "Taxonomy of public key schemes based on the problem of multivariate quadratic equations," Cryptology ePrint Archive: Report 2005/077, pp. 1-64 (Dec. 15, 2005).

Yang, G., Anonymous signature Schemes, Public Key Cryptography—PKC 2006 vol. 3958 of the series Lecture Notes in Computer Science pp. 347-363 (2006).

Zeng, S., et al., "A New Conditionally Anonymous Ring Signature," Computing and Combinatorics, vol. 6842, pp. 479-491 (2011).

Zhang, R., and Lmai, H., "Strong anonymous signatures," Information Security and Cryptology, vol. 5487, pp. 60-71 (Jan. 2008).

* cited by examiner

US 9,985,966 B2

ANONYMOUS SIGNATURE SCHEME

CROSS-REFERENCE TO RELATED APPLICATION

This application is the U.S. National Stage filing under 35 U.S.C. § 371 of International Application Ser. No. PCT/US2014/010427, filed on Jan. 7, 2014. The disclosure of the International Application is hereby incorporated herein by reference in its entirety.

BACKGROUND

Electronic transactions frequently involve a use of digital signatures. One feature of such digital signatures is a privacy of a signer. The privacy of a signer in a digital signature scheme usually includes two properties. One is signer anonymity, which means that a digital signature does not reveal the identity of the signer. The other is signature unlinkability, which means that it is not possible to tell whether two signatures have been signed by the same signer or not.

SUMMARY

In an example, a method performed under control of an end device may include receiving public parameters from a central system; generating an enciphering function based at least in part on the received public parameters; calculating signature parameters based at least in part on the generated enciphering function; and transmitting, to a verifying device, a signature that includes a message, a key corresponding to the end device, and the calculated signature parameters.

In another example, a method performed under control of a verifying device may include receiving at least one enciphering function from a central system; receiving, from an end device, a signature that includes a message, a key of the end device and signature parameters; enciphering the signature parameters; hashing the message; comparing the enciphered signature parameters and the hashed message; and determining that the signature is valid based at least in part on a result of the comparison.

In yet another example, an end device may include a receiving unit configured to receive public parameters from a central system; a function managing unit configured to generate an enciphering function based at least in part on the received public parameters; a processor configured to calculate signature parameters based at least in part on the generated enciphering function; and a transmitter configured to transmit, to a verifying device, a signature that includes a message, a key of the end device, and the calculated signature parameters.

In yet another example, a verifying device may include a receiving unit configured to: receive at least one enciphering function of from a central system, and receive, from an end device, a signature that includes a message, a key of the end device, and signature parameters; a processor configured to: encipher the signature parameters, and hash the message; and a determining unit configured to: compare the enciphered signature parameters to the hashed message, and determine that the signature is valid based at least in part on a result of the comparison.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
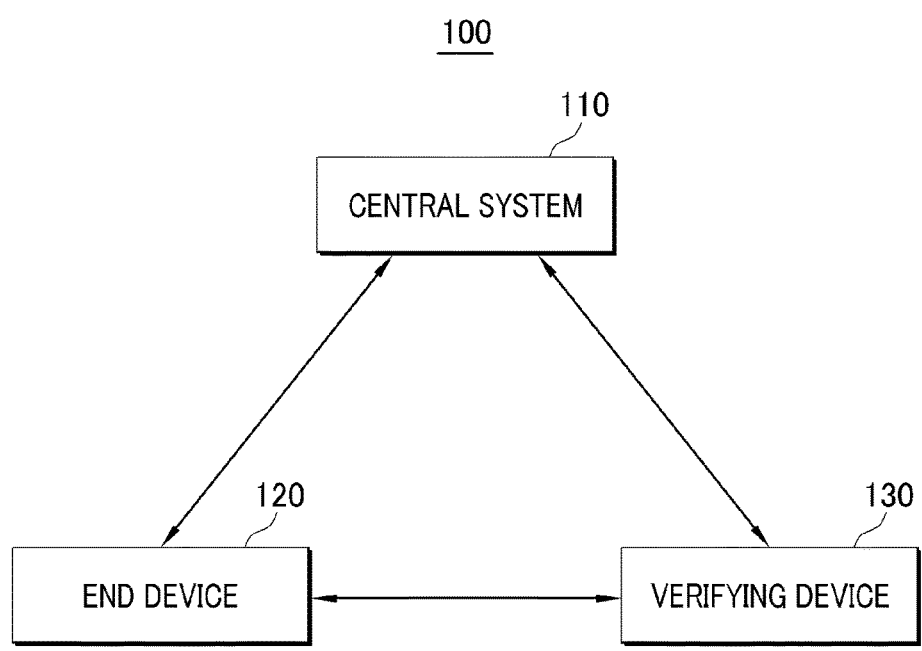
FIG. 1 schematically shows an illustrative example of an environment including a central system, an end device and a verifying device, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to an anonymous signature scheme. Technologies are generally described for a method for generating at least one anonymous signature and verifying at least one genuine signer who generated the anonymous signature.

In some embodiments, an end device may generate a digital anonymous signature and transmit the generated anonymous signature to a verifying device. For generating the digital anonymous signature, a few of system parameters and public parameters may be necessary. The end device may download and receive the system parameters and the public parameters from a central system, and generate an enciphering function based on the received system parameters and public parameters. Then, the end device may calculate signature parameters, which is to be included in the digital anonymous signature, and transmit, to the verifying device, the digital anonymous signature together with an original message, a key corresponding to the end device and the calculated signature parameters.

The verifying device may receive the digital anonymous signature which includes the original message, the key corresponding to the end device and the signature parameters from the end device. Further, for verifying the digital anonymous signature, the verifying device may receive an enciphering function from the central system and process the enciphering function with regard to the received signature parameters. Further, the verifying device may hash the received original message using at least one hash function. Then, the verifying device may compare the processing result of the enciphering function and the hashed function, and then determine whether the digital anonymous signature is valid or not based at least in part of the comparison result.

FIG. 1 schematically shows an illustrative example of an environment 100 including a central system 110, an end device 120 and a verifying device 130, arranged in accordance with at least some embodiments described herein. As illustrated in FIG. 1, central system 110, end device 120 and verifying device 130 may be connected to each other via a network. By way of example, but not limitation, the network between central system 110, end device 120 and verifying device 130 may include all kinds of wireless networks, non-limiting examples of which may include a mobile radio communication network, a satellite network, a bluetooth, WiBro (Wireless Broadband Internet), Mobile WiMAX, HSDPA (High Speed Downlink Packet Access) or the like.

In some embodiments, end device 120 may be configured to receive and download a few of parameters that may include system parameters, public parameters and hash function coefficients from central system 110. Further, end device 120 may be configured to generate an enciphering function of end device 120 based at least in part on the received system parameters and public parameters.

Further, end device 120 may be configured to transmit the generated enciphering function and the public parameters to central system 110. Then, verifying device 130 may be configured to use the enciphering function corresponding to end device 120 and the public parameters for the purpose of verifying an anonymous digital signature and a signer of the anonymous digital signature.

End device 120 may be further configured to calculate anonymous digital signature parameters based at least in part on the generated enciphering function. In some examples, the anonymous digital signature parameters may refer to parameters which satisfy a condition that a result of the enciphering function with regard to the parameters is the same as a result of a hash function with regard to an original message.

Further, end device 120 may be configured to transmit, to verifying device 130 via the network, anonymous signature information which includes an original message, the calculated anonymous digital signature parameters and a key corresponding to end device 120. In some examples, the key of end device 120 may refer to parameters that are obtained based at least in part on a result of a hash function with regard to a result of a deciphering function with regard to the original message.

Verifying device 130 may be configured to receive and download the enciphering function of end device 120 from central system 110. Further, verifying device 130 may be configured to receive, from end device 120, the anonymous signature information including the original message, the calculated anonymous digital signature parameters and the key corresponding to end device 120. Verifying device 130 may be configured to then encipher the received anonymous digital signature parameters by using the enciphering function, and to hash the original message by using a hash function. In some examples, hash function coefficients of the hash function may be provided from central system 110.

Further, verifying device 130 may be configured to compare the enciphered anonymous digital signature parameters and the hashed original message. Upon comparing, verifying device 130 may be configured to determine whether the anonymous digital signature is valid or not. In some embodiments, as described above, since the parameters for the anonymous digital signature satisfy a condition that a result of the enciphering function with regard to the parameters is the same as a result of a hash function with regard to an original message, if the enciphered anonymous digital signature parameters is equal to the hashed original message, verifying device 130 may be configured to determine that the anonymous digital signature is valid.

In some embodiments, end device 120 may be configured to generate a deciphering function corresponding to end device 120 based on the system parameters and public parameters. Further, end device 120 may be configured to decipher the original message and transmit, to verifying device 130 via the network, the deciphered original message.

Verifying device 130 may be configured to receive the deciphered version of the original message. Further, verifying device 130 may be configured to encipher the deciphered original message. Further, verifying device 130 may be configured to hash the deciphered version of the original message by using a hash function. Then, verifying device 130 may be configured to determine that end device 120 is a genuine signer which generated the anonymous digital signature based on a result of the enciphering of the deciphered original message and a result of the hashing of the deciphered version of the original message. In some examples, verifying device 130 may determine that the result of the enciphering of the deciphering original message is the same as the original message and the result of the hashing of the deciphered version of the original message is the same as the key corresponding to end device 120. Then, verifying device 130 may determine that end device 120 is the genuine signer.

Figure 2:
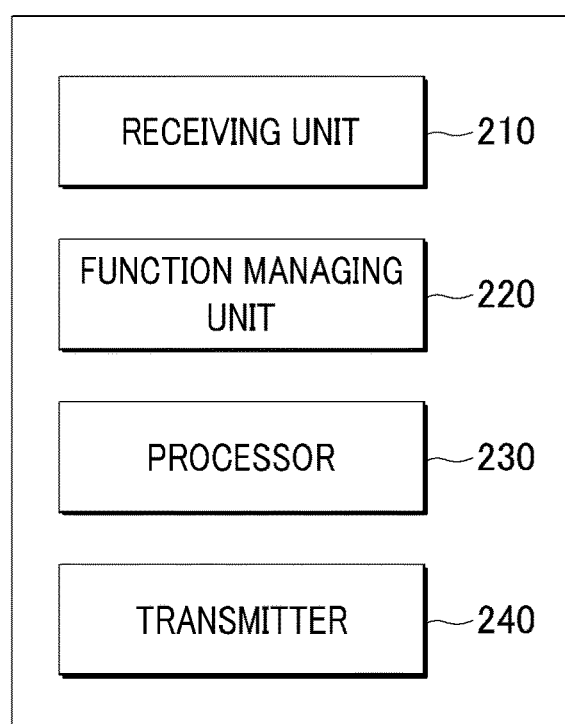
FIG. 2 shows a schematic block diagram illustrating an example architecture for an end device, arranged in accordance with at least some embodiments described herein.

FIG. 2 shows a schematic block diagram illustrating an example architecture for an end device, arranged in accordance with at least some embodiments described herein. As depicted in FIG. 2, end device 120 may include a receiving unit 210, a function managing unit 220, a processor 230 and a transmitter 240. Although illustrated as discrete components, various components may be divided into additional components, combined into fewer components, or eliminated altogether while being contemplated within the scope of the disclosed subject matter.

Receiving unit 210 may be configured to receive system parameters and public parameters from central system 110. By way of example, but not limitation, the system parameters may be engaged in octonion ring O and have a size of O ($2^{10}$). Receiving unit 210 may be further configured to receive hash function coefficients from central system 110.

Function managing unit 220 may be configured to generate an enciphering function of end device 120 based at least in part on the system parameters and public parameters. Further, function managing unit 220 may be configured to generate a deciphering function of end device 120 based at least in part on at least one of the system parameters and public parameters.

In some embodiments, processor 230 may be configured to calculate anonymous digital signature parameters based at least in part on the generated enciphering function. In some examples, the anonymous digital signature parameters may satisfy a condition that a result of the enciphering function with regard to the parameters is the same as a result of a hash function with regard to an original message.

Processor 230 may be further configured to decipher the original message by using the generated deciphering function. Further, processor 230 may be configured to hash the deciphered original message by using a hash function. A key of end device 120 may be obtained based at least in part on the hashed deciphered original message.

In some other embodiments, processor 230 may be configured to encipher anonymous digital signature parameters for at least two end devices. Further, processor 230 may be configured to decipher the enciphered anonymous digital signature parameters for the at least two end devices. Then, processor 230 may obtain the anonymous digital signature parameters for the at least two end devices from a result of deciphering. Further, processor 230 may be configured to obtain keys of the at least two end devices by using the results of deciphering and hash functions.

In some embodiments, transmitter 240 may be configured to transmit the generated enciphering function of end device 120 and the public parameters to central system 110 via a network. Further, transmitter 240 may be configured to transmit, to verifying device 130 via the network, anonymous signature information which includes an original message, the calculated anonymous digital signature parameters and the key of end device 120. Transmitter 240 may be further configured to transmit the deciphered original message to verifying device 130 via the network.

In some other embodiments, transmitter 240 may be configured to transmit, to verifying device 130 via the network, anonymous signature information which includes an original message, the anonymous digital signature parameters for the at least two end devices and the keys of the at least two end devices.

Figure 3:
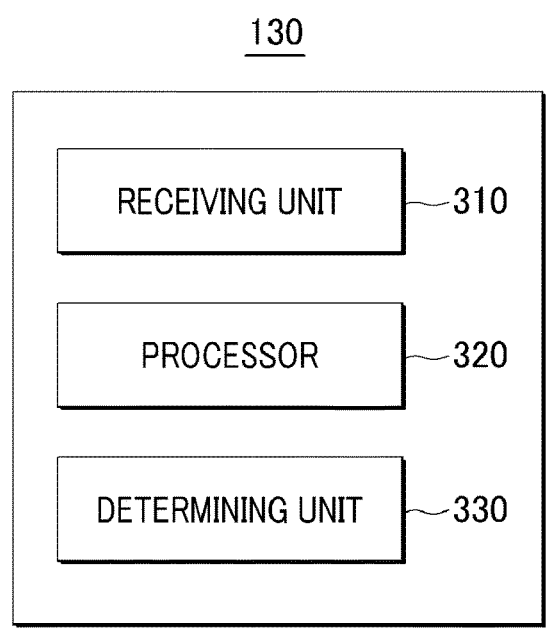
FIG. 3 shows a schematic block diagram illustrating an example architecture for a verifying device, arranged in accordance with at least some embodiments described herein.

FIG. 3 shows a schematic block diagram illustrating an example architecture for a verifying device, arranged in accordance with at least some embodiments described herein. As depicted in FIG. 3, verifying device 130 may include a receiving unit 310, a processor 320 and a determining unit 330. Although illustrated as discrete components, various components may be divided into additional components, combined into fewer components, or eliminated altogether while being contemplated within the scope of the disclosed subject matter.

Receiving unit 310 may be configured to receive at least one enciphering function from central system 110. Further, receiving unit 310 may be configured to receive, from end device 120, anonymous signature information that includes an original message, a key of at least one end device 120 and at least one anonymous digital signature parameters. Receiving unit 310 may be further configured to receive, from end device 120, a deciphered original message.

Processor 320 may be configured to encipher the anonymous digital signature parameters by using the at least one enciphering function. Further, processor 320 may be configured to hash original message by using a hash function. In some examples, hash function coefficients of the hash function may be provided from central system 110.

In some embodiments, processor 320 may be configured to encipher anonymous digital signature parameters for each of at least two end devices. Then, processor 320 may be configured to sum each of the enciphered anonymous digital signature parameters.

Further, processor 320 may be configured to encipher the deciphered original message. Further, processor 320 may be configured to hash the deciphered original message.

Determining unit 330 may be configured to compare the enciphered anonymous digital signature parameters to the hashed original message. Upon comparing, determining unit 330 may be further configured to determine that the anonymous digital signature is valid, if the enciphered anonymous digital signature parameters are equal to the hashed original message.

In some embodiments, determining unit 330 may be configured to compare the summed enciphered anonymous digital signature parameters with the hashed original message. Upon comparing, determining unit 330 may be further configured to determine that the at least two anonymous digital signatures are valid, if the summed result of the enciphered anonymous digital signature parameters is equal to the hashed original message.

Further, determining unit 330 may be configured to determine whether the enciphered deciphered original message is the same as the original message. If the result of the enciphering function with regard to the result of the deciphering function of the original message is determined to be the same as the original message, determining unit 330 may determine that end device 120 is a genuine signer that generated the anonymous digital signature.

Further, determining unit 330 may be configured to determine whether the hashed deciphered original message is the same as the key corresponding to end device 120. If the result of the hash function with regard to the result of the deciphering function of the original message is determined to be the same as the key of end device 120, determining unit 330 may determine that end device 120 is the genuine signer that generated the anonymous digital signature. Otherwise, if the result of the hash function with regard to the result of the deciphering function of the original message is determined to be different from the key of end device 120, determining unit 330 may determine that the anonymous digital signature is not generated by end device 120.

Figure 4:
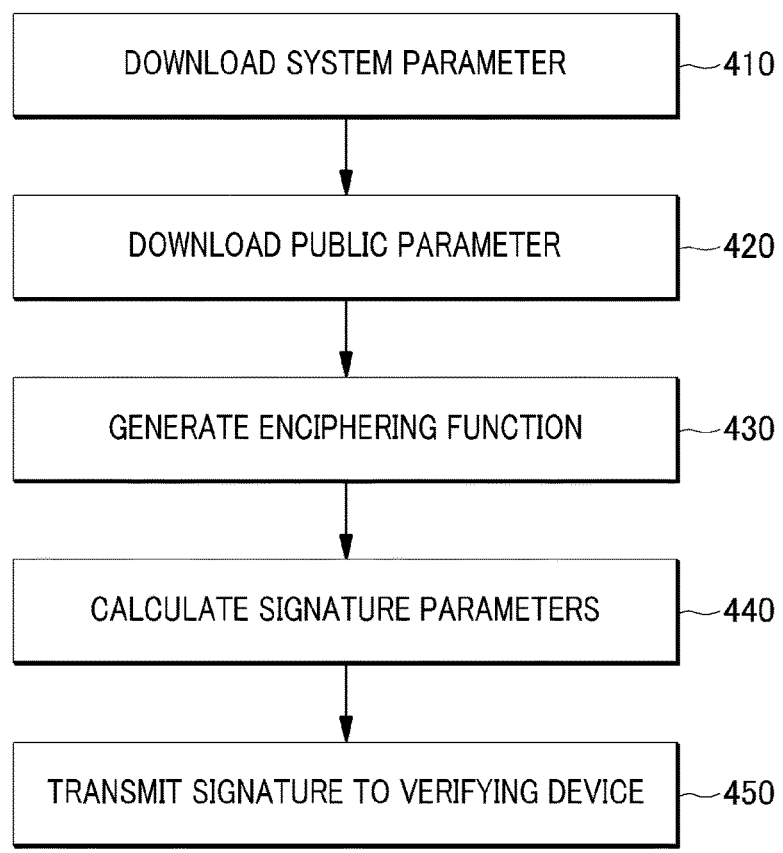
FIG. 4 schematically shows an example flow diagram of a process of an end device for generating a signature, arranged in accordance with at least some embodiments described herein.

FIG. 4 schematically shows an example flow 400 diagram of a process of an end device for generating a signature, arranged in accordance with at least some embodiments described herein. The process in FIG. 4 may be implemented in environment 100 including central system 110, end device 120 and verifying device 130, as illustrated in FIG. 1. An example process may include one or more operations, actions, or functions as illustrated by one or more blocks 410, 420, 430, 440, and/or 450. Although illustrated as discrete blocks, various blocks may be divided into additional blocks, combined into fewer blocks, or eliminated, depending on the desired implementation. Processing may begin at block 410.

At block 410 (Download System Parameter), end device 120 may download and receive system parameters from central system 110. By way of example, but not limitation, the system parameters may be engaged in octonion ring O and have a size of O $(2^{10})$. Processing may proceed from block 410 to block 420.

At block 420 (Download Public Parameter), end device 120 may download and receive public parameters of end device 120 from central system 110. Processing may proceed from block 420 to block 430.

At block 430 (Generate Enciphering Function), end device 120 may generate an enciphering function of end device 120 based at least in part on the system parameters received at block 410 and public parameters of end device 120 received at block 420. Processing may proceed from block 430 to block 440.

At block 440 (Calculate Signature Parameters), end device 120 may calculate anonymous digital signature parameters based at least in part on the enciphering function generated at block 430. The calculated parameters for an anonymous digital signature may satisfy a condition that the enciphered parameters are the same as a hashed original message. Processing may proceed from block 440 to block 450.

At block 450 (Transmit Signature to Verifying Device), end device 120 may transmit, to verifying device 130 via a network, anonymous signature information which includes an original message, the anonymous signature parameters, which are calculated at block 440, and a key corresponding to end device 120. In some embodiments, the key corresponding to end device 120 may refer to parameters that are obtained based at least in part on a result of a hash function with regard to a result of a deciphering function of end device 120 with regard to the original message.

Figure 5:
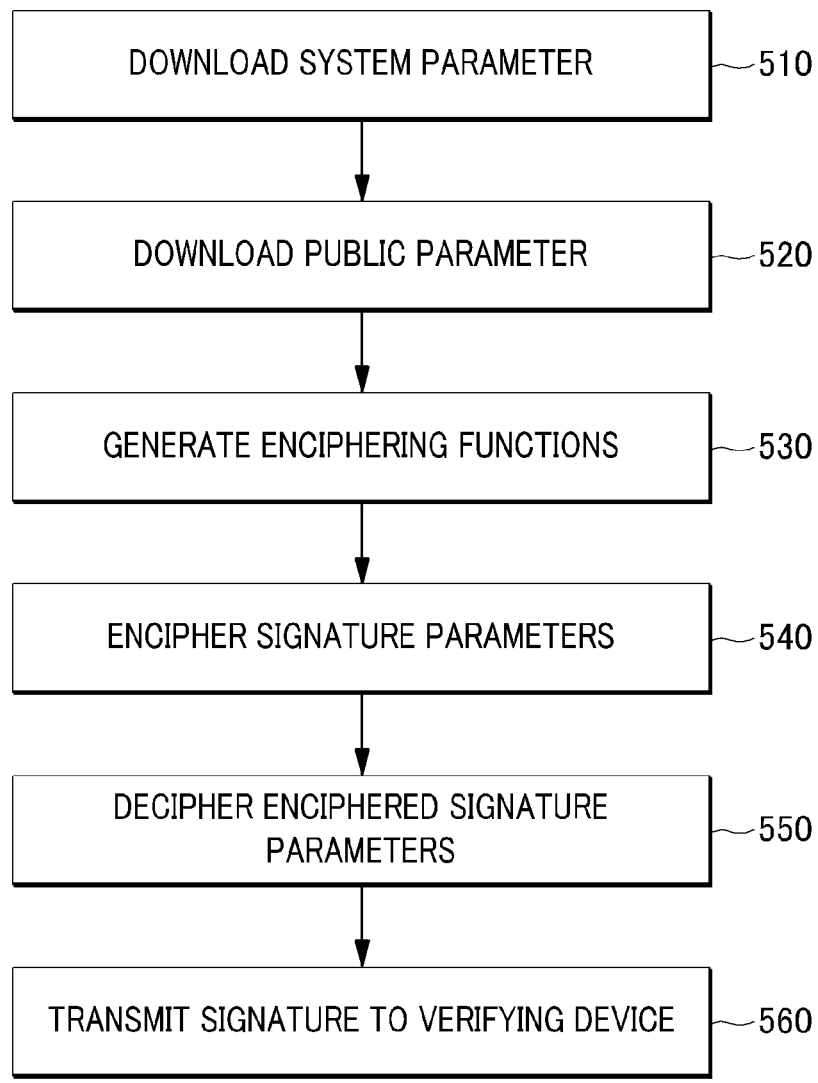
FIG. 5 schematically shows an example flow diagram of a process of an end device for generating signatures, arranged in accordance with at least some embodiments described herein.

FIG. 5 schematically shows an example flow 500 diagram of a process of an end device for generating signatures, arranged in accordance with at least some embodiments described herein. The process in FIG. 5 may be implemented in environment 100 including central system 110, end device 120 and verifying device 130, as illustrated in FIG. 1. An example process may include one or more operations, actions, or functions as illustrated by one or more blocks 510, 520, 530, 540, 550, and/or 560. Although illustrated as discrete blocks, various blocks may be divided into additional blocks, combined into fewer blocks, or eliminated, depending on the desired implementation. Processing may begin at block 510.

At block 510 (Download System Parameter), end device 120 may download and receive system parameters from central system 110. By way of example, but not limitation, the system parameters may be engaged in octonion ring O and have a size of O $(2^{10})$. Processing may proceed from block 510 to block 520.

At block 520 (Download Public Parameter), end device 120 may download and receive public parameters of at least two end devices from central system 110. Processing may proceed from block 520 to block 530.

At block 530 (Generate Enciphering Functions), end device 120 may generate at least two enciphering functions of the at least two end devices based at least in part on the system parameters received at block 510 and public parameters of the at least two end devices received at block 520. Processing may proceed from block 530 to block 540.

At block 540 (Encipher Signature Parameters), end device 120 may encipher anonymous digital signature parameters for the at least two end devices by using the at least two enciphering functions. The parameters for each of the at least two anonymous digital signatures may satisfy a condition that a result of the enciphering function with regard to the parameters is the same as a result of a hash function with regard to an original message. Processing may proceed from block 540 to block 550.

At block 550 (Decipher Enciphered Signature Parameters), end device 120 may decipher the anonymous digital signature parameters for the at least two end devices, which are enciphered at block 540. Accordingly, end device 120 may obtain the parameters for at least two anonymous digital signatures of the at least two end devices. Processing may proceed from block 550 to block 560.

At block 560 (Transmit Signature to Verifying Device), end device 120 may transmit, to verifying device 130 via a network, anonymous signature information which includes an original message, the parameters for the at least two anonymous digital signatures and keys corresponding to the at least two devices.

Figure 6:
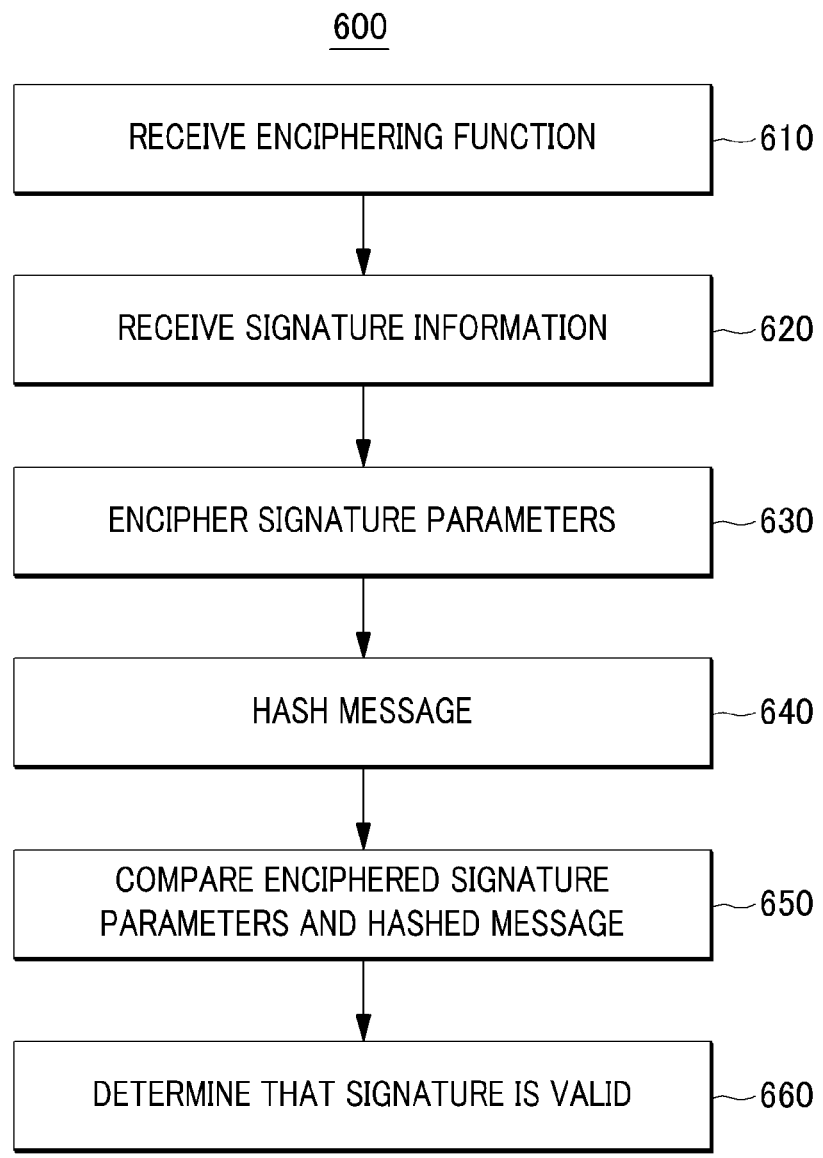
FIG. 6 schematically shows an example flow diagram of a process of a verifying device for verifying a signature, arranged in accordance with at least some embodiments described herein.

FIG. 6 schematically shows an example flow 600 diagram of a process of a verifying device for verifying a signature, arranged in accordance with at least some embodiments described herein. The process in FIG. 6 may be implemented in environment 100 including central system 110, end device 120 and verifying device 130, as illustrated in FIG. 1. An example process may include one or more operations, actions, or functions as illustrated by one or more blocks 610, 620, 630, 640, 650, and/or 660. Although illustrated as discrete blocks, various blocks may be divided into additional blocks, combined into fewer blocks, or eliminated, depending on the desired implementation. Processing may begin at block 610.

At block 610 (Receive Enciphering Function), verifying device 130 may receive an enciphering function of end device 120 from central system 110. In some embodiments, the enciphering function of end device 120 is transmitted to central system 110 by end device 120 and central system 110 stores the enciphering function of end device 120. Then, verifying device 130 downloads the enciphering function from central system 110. Processing may proceed from block 610 to block 620.

At block 620 (Receive Signature Information), verifying device 130 may receive, from end device 120, anonymous signature information which includes an original message, anonymous digital signature parameters for end device 120 and a key corresponding to end device 120. The parameters for an anonymous digital signature may satisfy a condition that a result of the enciphering function with regard to the parameters is the same as a result of a hash function with regard to an original message. Further, the key corresponding to end device 120 may refer to parameters that are obtained based at least in part on a result of a hash function with regard to a result of a deciphering function of end device 120 with regard to the original message. Processing may proceed from block 620 to block 630.

At block 630 (Encipher Signature Parameters), verifying device 130 may encipher the anonymous digital signature parameters, which are received at block 620 by using the enciphering function, which is received at block 610. Processing may proceed from block 630 to block 640.

At block 640 (Hash Message), verifying device 130 may hash the original message, which is received at block 620 by using a hash function. In some examples, hash function coefficients of the hash function may be provided from central system 110. Processing may proceed from block 640 to block 650.

At block 650 (Compare Enciphered Signature Parameters and Hashed Message), verifying device 130 may compare the signature parameters, which is enciphered at block 630, and the hashed original message. Processing may proceed from block 650 to block 660.

At block 660 (Determine that Signature is Valid), verifying device 130 may determine whether the anonymous digital signature information, which is received from end device 120 at block 620, is valid or not based on the comparison result of block 650. In some embodiments, if the enciphered signature parameters are equal to the hashed original message, verifying device 130 may determine that the anonymous digital signature is valid.

Figure 7:
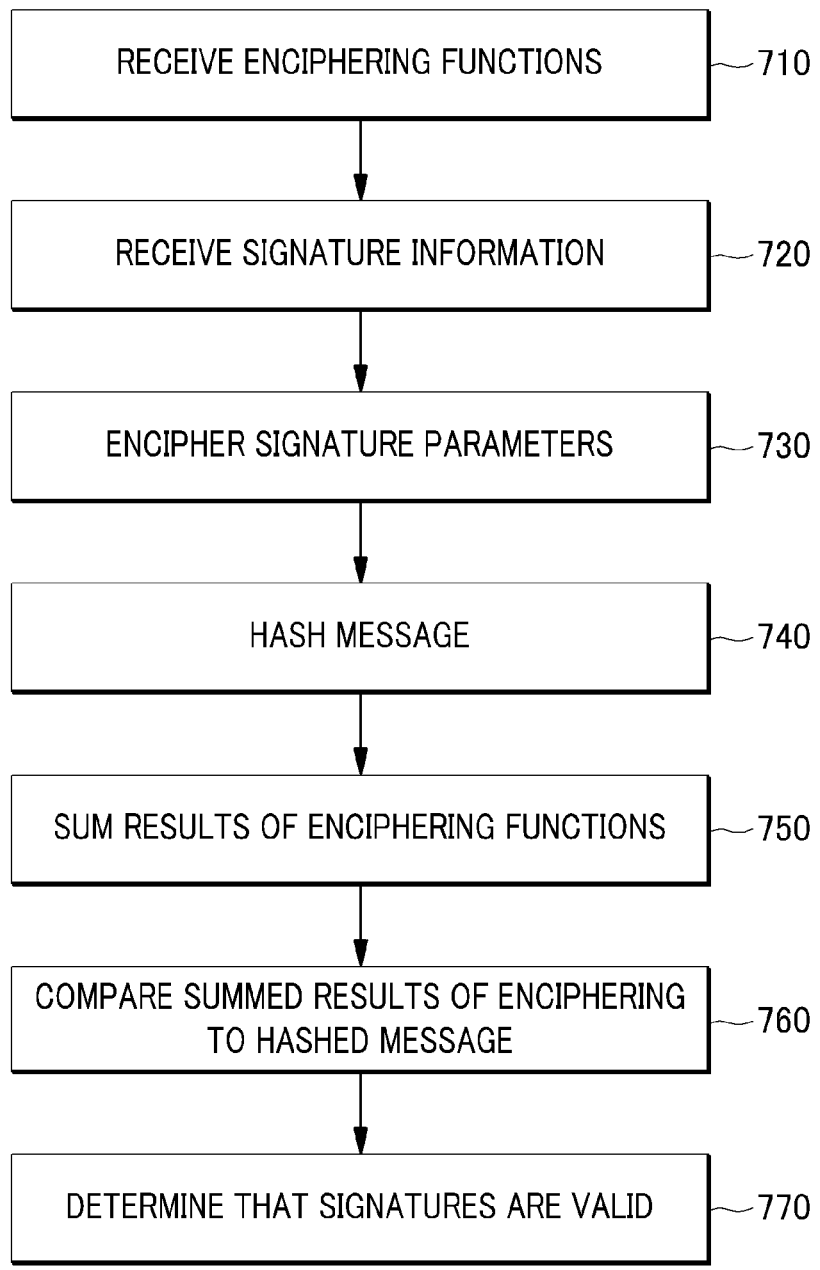
FIG. 7 schematically shows an example flow diagram of a process of a verifying device for verifying signatures, arranged in accordance with at least some embodiments described herein.

FIG. 7 schematically shows an example flow 700 diagram of a process of a verifying device for verifying signatures arranged in accordance with at least some embodiments described herein. The process in FIG. 7 may be implemented in environment 100 including central system 110, end device 120 and verifying device 130, as illustrated in FIG. 1. An example process may include one or more operations, actions, or functions as illustrated by one or more blocks 710, 720, 730, 740, 750, 760 and/or 770. Although illustrated as discrete blocks, various blocks may be divided into additional blocks, combined into fewer blocks, or eliminated, depending on the desired implementation. Processing may begin at block 710.

At block 710 (Receive Enciphering Functions), verifying device 130 may receive at least two enciphering functions of at least two end devices from central system 110. Processing may proceed from block 710 to block 720.

At block 720 (Receive Signature Information), verifying device 130 may receive, from end device 120, anonymous signature information which includes an original message, anonymous digital signatures parameters for the at least two end devices and keys corresponding to the at least two devices. Processing may proceed from block 720 to block 730.

At block 730 (Encipher Signature Parameters), verifying device 130 may encipher anonymous digital signatures parameters for each of the at least two end devices by using each of the at least two enciphering functions, which is received at block 710. Processing may proceed from block 730 to block 740.

At block 740 (Hash Message), verifying device 130 may hash the original message by using a hash function. In some examples, hash function coefficients of the hash function may be provided from central system 110. Processing may proceed from block 740 to block 750.

At block 750 (Sum Results of Enciphering Functions), verifying device 130 may sum results of enciphering of the anonymous digital signatures parameters for each of the at least two end devices, which is performed at block 730. Processing may proceed from block 750 to block 760.

At block 760 (Compare Summed Results of Enciphering to Hashed Message), verifying device 130 may compare the summed results of enciphering of the anonymous digital signatures parameters for each of the at least two end devices, which is obtained at block 750, to the hashed original message. Processing may proceed from block 760 to block 770.

At block 770 (Determine that Signatures are Valid), verifying device 130 may determine that the anonymous signature information for the at least two devices are valid or not based on the comparison result of block 760. In some embodiments, if the summed results of block 750 are equal to the hashed the original message, verifying device 130 may determine that the at least two anonymous digital signatures are valid.

Figure 8:
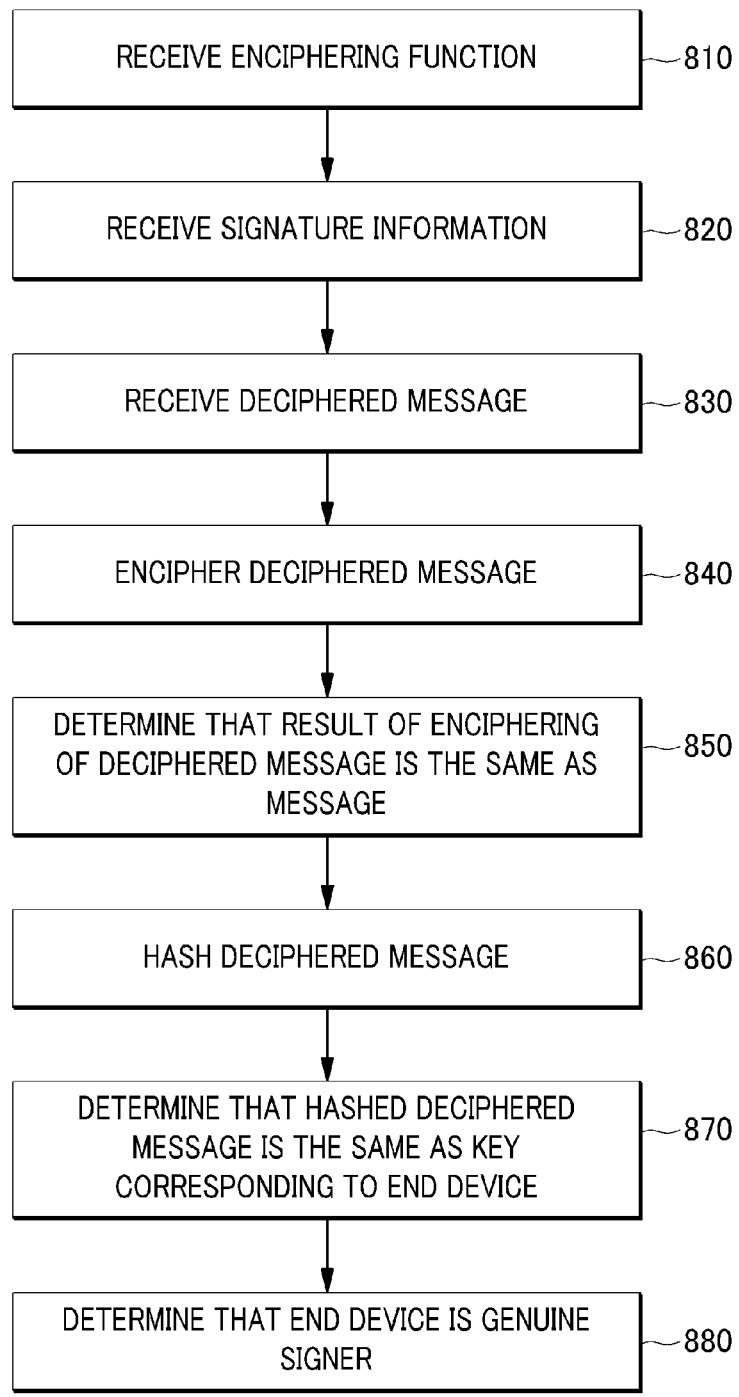
FIG. 8 schematically shows an example flow diagram of a process of a verifying device for verifying a signer, arranged in accordance with at least some embodiments described herein.

FIG. 8 schematically shows an example flow 800 diagram of a process of a verifying device for verifying a signer, arranged in accordance with at least some embodiments described herein. The process in FIG. 8 may be implemented in environment 100 including central system 110, end device 120 and verifying device 130, as illustrated in FIG. 1. An example process may include one or more operations, actions, or functions as illustrated by one or more blocks 810, 820, 830, 840, 850, 860, 870 and/or 880. Although illustrated as discrete blocks, various blocks may be divided into additional blocks, combined into fewer blocks, or eliminated, depending on the desired implementation. Processing may begin at block 810.

At block 810 (Receive Enciphering Function), verifying device 130 may receive an enciphering function of end device 120 from central system 110. Processing may proceed from block 810 to block 820.

At block 820 (Receive Signature Information), verifying device 130 may receive anonymous signature information which includes an original message, anonymous digital signature parameters for end device 120 and a key corresponding to end device 120. Processing may proceed from block 820 to block 830.

At block 830 (Receive Deciphered Message), verifying device 130 may receive, from end device 120, a deciphered version of the original message. In some embodiments, end device 120 may be configured to generate a deciphering function of end device 120 based at least in part on system parameters and public parameters. Further, end device 120 may be configured to decipher the original message. Then, end device 120 may be further configured to transmit the deciphered original message to verifying device 130. Processing may proceed from block 830 to block 840.

At block 840 (Encipher Deciphered Message), verifying device 130 may encipher the deciphered version of the original message, which is received at block 830 by using the enciphering function, which is received at block 810. Processing may proceed from block 840 to block 850.

At block 850 (Determine that Result of Enciphering of Deciphered Message is the Same as Message), verifying device 130 may determine that a result of the enciphering of the deciphered version of the original message is the same as the original message. Processing may proceed from block 850 to block 860.

At block 860 (Hash Deciphered Message), verifying device 130 may hash the deciphered version of the original message, which is received at block 830 by using a hash function. In some examples, hash function coefficients of the hash function may be provided from central system 110. Processing may proceed from block 860 to block 870.

At block 870 (Determine that Hashed Deciphered Message is the Same as Key Corresponding to End Device), verifying device 130 may determine that the hashed deciphered version of the original message is the same as the key corresponding to end device 120. Processing may proceed from block 870 to block 880.

At block 880 (Determine that End Device is Genuine Signer), verifying device 130 may determine that end device 120 is a genuine signer which generated the anonymous digital signature, if the hashed deciphered version of the original message is determined to be the same as the key corresponding to end device 120 at block 870. Alternatively, verifying device 130 may determine that the anonymous digital signature is not generated by end device 120, if the hashed deciphered version of the original message is determined to be different from the key corresponding to end device 120 at block 870.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 9:
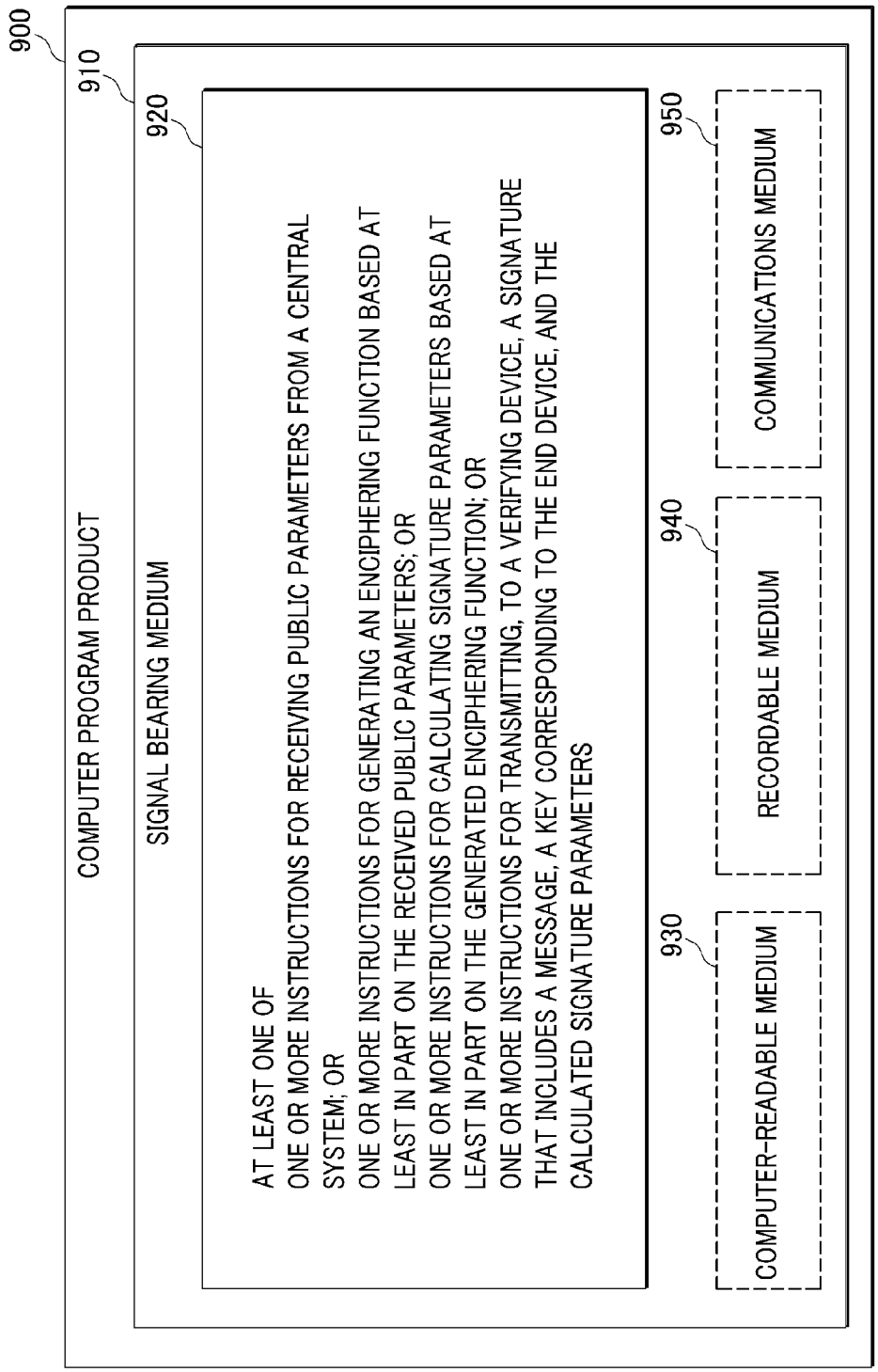
FIG. 9 illustrates computer program products that may be utilized to provide an anonymous signature scheme, arranged in accordance with at least some embodiments described herein.

FIG. 9 illustrates computer program products that may be utilized to provide an anonymous signature scheme, arranged in accordance with at least some embodiments described herein. Program product 900 may include a signal bearing medium 910. Signal bearing medium 910 may include one or more instructions 920 that, when executed by, for example, a processor, may provide the functionality described above with respect to FIGS. 1-8. By way of example, instructions 920 may include: one or more instructions for receiving public parameters from a central system; generating an enciphering function based at least in part on the received public parameters; calculating signature parameters based at least in part on the generated enciphering function; and transmitting, to a verifying device, a signature that includes a message, a key corresponding to the end device, and the calculated signature parameters. Thus, for example, referring to FIG. 4, end device 120 may undertake one or more of the blocks shown in FIG. 4 in response to instructions 920.

In some implementations, signal bearing medium 910 may encompass a computer-readable medium 930, such as, but not limited to, a hard disk drive, a CD, a DVD, a digital tape, memory, etc. In some implementations, signal bearing medium 910 may encompass a recordable medium 940, such as, but not limited to, memory, read/write (R/W) CDs, R/W DVDs, etc. In some implementations, signal bearing medium 910 may encompass a communications medium 950, such as, but not limited to, a digital and/or an analog communication medium (e.g., a fiber optic cable, a waveguide, a wired communications link, a wireless communication link, etc.). Thus, for example, program product 900 may be conveyed to one or more modules of end device 120 by an RF signal bearing medium 920, where the signal bearing medium 920 is conveyed by a wireless communications medium 950 (e.g., a wireless communications medium conforming with the IEEE 802.11 standard).

Figure 10:
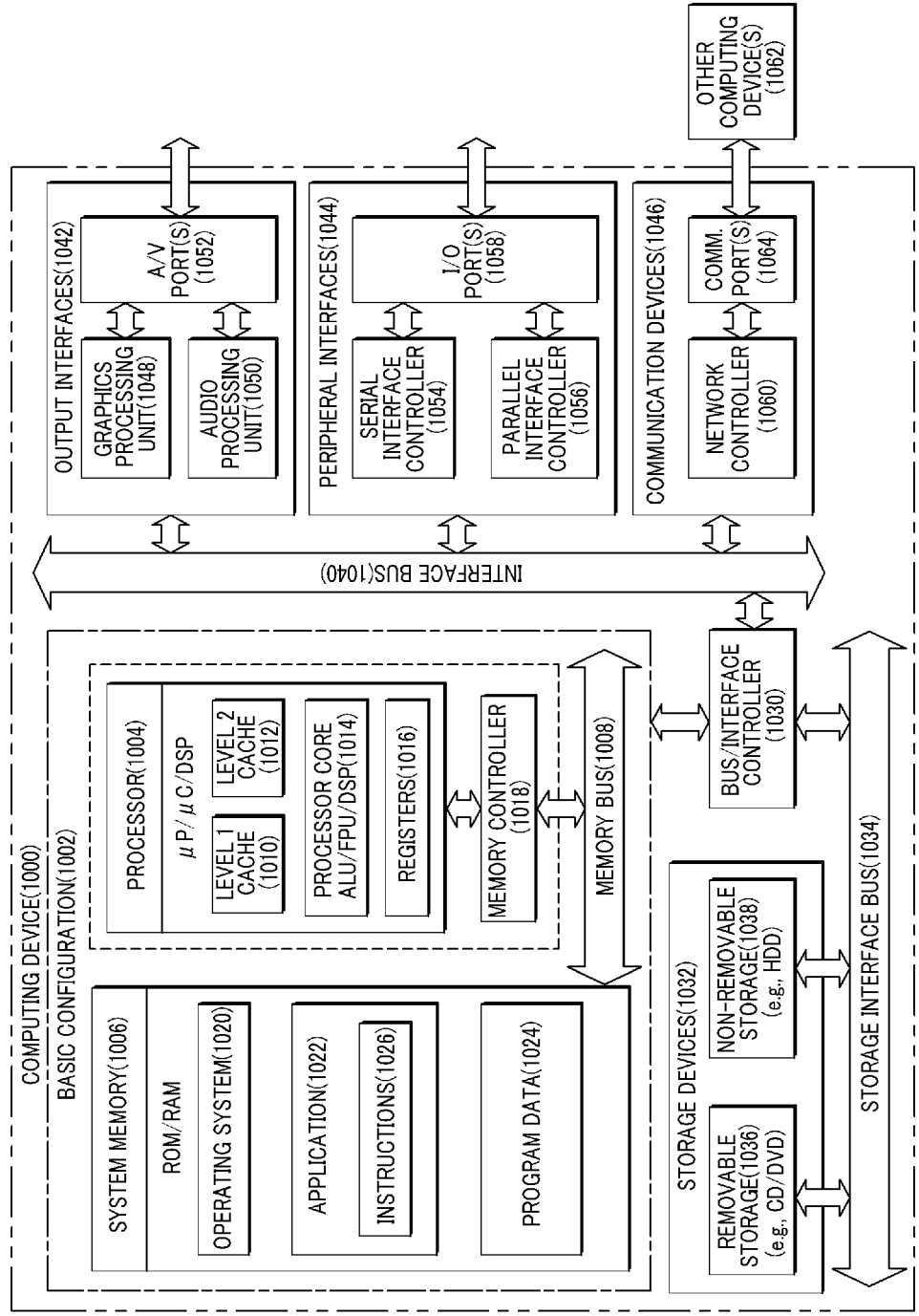
FIG. 10 is a block diagram illustrating an example computing device that may be utilized to provide an anonymous signature scheme, arranged in accordance with at least some embodiments described herein.

FIG. 10 is a block diagram illustrating an example computing device that may be utilized to provide an anonymous signature scheme, arranged in accordance with at least some embodiments described herein. In these examples, elements of computing device 1000 may be arranged or configured for a device. In a very basic configuration 1002, computing device 1000 typically includes one or more processors 1004 and a system memory 1006. A memory bus 1008 may be used for communicating between processor 1004 and system memory 1006.

Depending on the desired configuration, processor 1004 may be of any type including but not limited to a microprocessor (µP), a microcontroller (µC), a digital signal processor (DSP), or any combination thereof. Processor 1004 may include one more levels of caching, such as a level one cache 1010 and a level two cache 1012, a processor core 1014, and registers 1016. An example processor core 1014 may include an arithmetic logic unit (ALU), a floating point unit (FPU), a digital signal processing core (DSP Core), or any combination thereof. An example memory controller 1018 may also be used with processor 1004, or in some implementations memory controller 1018 may be an internal part of processor 1004.

Depending on the desired configuration, system memory 1006 may be of any type including but not limited to volatile memory (such as RAM), nonvolatile memory (such as ROM, flash memory, etc.) or any combination thereof. System memory 1006 may include an operating system 1020, one or more applications 1022, and program data 1024. Application 1022 may include instructions 1026 that may be arranged to perform the functions as described herein including the actions described with respect to end device architecture as shown in FIG. 2 or including the actions described with respect to the flow charts shown in FIGS. 4-5. In some examples, application 1022 may be arranged to operate with program data 1024 on an operating system 1020 such that the anonymous signature scheme as described herein may be provided.

Computing device 1000 may have additional features or functionality, and additional interfaces to facilitate communications between basic configuration 1002 and any required devices and interfaces. For example, a bus/interface controller 1030 may be used to facilitate communications between basic configuration 1002 and one or more data storage devices 1032 via a storage interface bus 1034. Data storage devices 1032 may be removable storage devices 1036, non-removable storage devices 1038, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1006, removable storage devices 1036 and non-removable storage devices 1038 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

Computing device 1000 may also include an interface bus 1040 for facilitating communication from various interface devices (e.g., output devices 1042, peripheral interfaces 1044, and communication devices 1046) to basic configuration 1002 via bus/interface controller 1030. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1046 includes a network controller 1060, which may be arranged to facilitate communications with one or more other computing devices 1062 over a network communication link via one or more communication ports 1064.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of an end device, the method comprising:
    receiving public parameters of the end device and system parameters from a central system, wherein the system parameters are associated with an octonion ring;
    generating an enciphering function that corresponds to the end device based at least, in part, on the received public parameters of the end device and the received system parameters;
    calculating signature parameters for the end device based at least, in part, on the generated enciphering function that corresponds to the end device;
    generating a deciphering function that corresponds to the end device based at least, in part, on the received public parameters of the end device and the received system parameters;
    deciphering a message based on the generated deciphering function;
    hashing the deciphered message; and
    transmitting, to a verification device, signature information that includes the message, a key that corresponds to the end device, the calculated signature parameters for the end device, and the deciphered message, wherein the key that corresponds to the end device is obtained based at least, in part, on the hashing.

2. The method of claim 1, further comprising:
    transmitting the generated enciphering function that corresponds to the end device, to the central system.

3. The method of claim 1, further comprising:
    enciphering signature parameters for at least two end devices;
    deciphering the enciphered signature parameters for the at least two end devices; and
    transmitting, to the verification device, the signature information that includes the message, keys that correspond to the at least two end devices, and the deciphered signature parameters for the at least two end devices.

4. A method performed under control of a verification device, the method comprising:
    receiving enciphering functions that correspond to at least two end devices from a central system;
    receiving, from an end device, signature information that includes a message, keys that correspond to the at least two end devices, and signature parameters for at least two signatures of the at least two end devices;
    enciphering the received signature parameters for each of the at least two end devices based on the received enciphering functions that correspond to the at least two end devices;
    hashing the message;
    summing results of the enciphering of the received signature parameters for each of the at least two end devices;
    comparing the summed results and the hashed message; and
    determining that the at least two signatures that correspond to the at least two end devices are valid based at least, in part, on a result of the comparison of the summed results and the hashed message.

5. The method of claim 4, further comprising:
    receiving, from the end device, a deciphered version of the message;
    enciphering the deciphered version of the message;
    determining that a result of the enciphering of the deciphered message is same as the message; and
    determining that the at least two signatures are generated by the at least two end devices, based on the determination that the result of the enciphering of the deciphered message is same as the message.

6. The method of claim 5, further comprising:
    hashing the deciphered version of the message; and
    determining whether the hashed deciphered message is same as each of the keys that corresponds to the at least two end devices,
    wherein determining that the at least two signatures are generated by the at least two end devices is further based on a determination that the hashed deciphered message is same as each of the keys that corresponds to the at least two end devices.

7. The method of claim 6, further comprising:
    determining that the at least two signatures are not generated by the at least two end devices based on a determination that the hashed deciphered message is different than each of the keys that corresponds to the at least two end devices.

8. An end device, comprising:
    a receiver unit configured to receive public parameters of the end device from a central system;
    a function management unit, operatively coupled to the receiver unit, configured to:
        generate an enciphering function that corresponds to the end device based at least, in part, on the received public parameters of the end device; and
        generate a deciphering function that corresponds to the end device based at least, in part, on the received public parameters of the end device;
    a processor, operatively coupled to the function management unit, configured to:
        calculate signature parameters for the end device based at least, in part, on the generated enciphering function that corresponds to the end device;
        decipher a message based on the generated deciphering function; and
        hash the deciphered message; and
    a transmitter, operatively coupled to the receiver unit, the function management unit, and the processor, configured to transmit, to a verification device, signature information that includes the message, a key that corresponds to the end device, the calculated signature parameters for the end device, and the deciphered message, wherein the key that corresponds to the end device is obtained based at least, in part, on the hashing.

9. The end device of claim 8, wherein the receiver unit is further configured to receive system parameters from the central system, and
    wherein the function management unit is configured to generate the enciphering function further based on the received system parameters.

10. The end device of claim 8, wherein the transmitter is further configured to transmit the generated enciphering function that corresponds to the end device, to the central system.

11. The end device of claim 8, wherein the processor is further configured to encipher signature parameters for at least two end devices, and decipher the enciphered signature parameters for the at least two end devices, and
    wherein the transmitter is further configured to transmit, to the verification device, the signature information that includes the message, keys that correspond to the at least two end devices, and the deciphered signature parameters for the at least two end devices.

12. A verification device, comprising:
a receiver unit configured to:
receive enciphering functions that correspond to at least two end devices from a central system, and
receive, from an end device, signature information that includes a message, keys that correspond to the at least two end devices, and signature parameters for at least two signatures of the at least two end devices;
a processor, operatively coupled to the receiver unit, configured to:
encipher the received signature parameters for the at least two end devices based on the received enciphering functions that correspond to the at least two end devices,
hash the message; and
sum results of the enciphered signature parameters for the at least two end devices; and
a determination unit, operatively coupled to the receiver unit and the processor, configured to:
compare the summed results and the hashed message, and
determine that the at least two signatures that correspond to the least two end devices are valid based at least, in part, on a result of the comparison of the summed results and the hashed message.

13. The verification device of claim 12, wherein the receiver unit is further configured to receive, from the end device, a deciphered version of the message,
wherein the processor is further configured to encipher the deciphered version of the message, and
wherein the determination unit is further configured to:
determine that a result of the enciphering of the deciphered message is same as the message, and
determine that the at least two signatures are generated by the at least two end devices based on the determination that the result of the enciphering of the deciphered message is same as the message.

14. The verification device of claim 13, wherein the processor is further configured to hash the deciphered message, and
wherein the determination unit is further configured to:
determine whether the hashed deciphered message is same as each of the keys that corresponds to the at least two end devices, and
determine that the at least two signatures are generated by the at least two end devices further based on a determination that the hashed deciphered message is same as each of the keys that corresponds to the at least two end devices.

15. The verification device of claim 14, wherein the determination unit is further configured to determine that the at least two signatures are not generated by the at least two end devices based on a determination that the hashed deciphered message is different than each of the keys that corresponds to the at least two end devices.

16. A method performed under control of an end device, the method comprising:
receiving public parameters of the end device from a central system;
generating an enciphering function that corresponds to the end device based at least, in part, on the received public parameters of the end device;
calculating signature parameters for the end device based at least, in part, on the generated enciphering function that corresponds to the end device, wherein the calculated signature parameters for the end device include parameters on which an application of the generated enciphering function that corresponds to the end device generates a first result that is same as a second result generated by an application of a hash function to a message;
generating a deciphering function that corresponds to the end device based at least, in part, on the received public parameters of the end device;
deciphering a message based on the generated deciphering function;
hashing the deciphered message; and
transmitting, to a verification device, signature information that includes the message, a key that corresponds to the end device, the calculated signature parameters for the end device, and the deciphered message, wherein the key that corresponds to the end device is obtained based at least, in part, on the hashing.

* * * * *